United States Patent
Crook

(10) Patent No.: US 6,975,720 B1
(45) Date of Patent: Dec. 13, 2005

(54) METHOD OF PROCESSING AN INBOUND CALL IN A CALL CENTER

(75) Inventor: John Crook, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/523,935

(22) Filed: Mar. 13, 2000

(51) Int. Cl.[7] .................. H04M 3/48; H04M 3/523; H04Q 3/64
(52) U.S. Cl. .................. 379/266.01; 379/210.01
(58) Field of Search .............. 379/209.01, 210.01, 379/265.01, 265.02, 266.01, 266.02, 266.03, 266.06, 266.07, 266.08

(56) References Cited

U.S. PATENT DOCUMENTS

| | | | | |
|---|---|---|---|---|
| 5,537,470 A | * | 7/1996 | Lee .................. | 379/265.11 |
| 5,657,383 A | * | 8/1997 | Gerber et al. .......... | 379/266.01 |
| 5,692,033 A | * | 11/1997 | Farris .................. | 379/67.1 |
| 6,259,786 B1 | * | 7/2001 | Gisby .................. | 379/266.01 |
| 6,411,805 B1 | * | 6/2002 | Becker et al. .......... | 455/414.1 |

* cited by examiner

Primary Examiner—Harry S. Hong
(74) Attorney, Agent, or Firm—Alan Pedersen-Giles

(57) ABSTRACT

A method for call center to processing inbound call from a caller during a busy time is disclosed in which the caller will be assigned a place in the queue, an identification and a time window. The call center will keep the place of the caller after the first call is disconnected. The caller shall call back within the time window assigned to him to claim his place in the queue. The caller may place the second call in any moment convenient to him within the time window, or even from a different telephone.

55 Claims, 2 Drawing Sheets

METHOD OF PROCESSING AN INBOUND CALL IN A CALL CENTER

TECHNICAL FIELD OF THE INVENTION

This invention relates to call processing in a call center, and more particularly, to a method for a call center to process an inbound call from a caller during a busy time when no agent in the call center can be immediately available to the caller.

BACKGROUND OF THE INVENTION

Many companies or organizations have a call center for selling services and products or providing customer services. A customer may call into, usually by dialing a toll-free number, the call center to subscribe to a service or to ask for customer services. Usually an automatic response system replies to the call and asks the caller to keep holding until an agent is available for the caller. The customer has to wait on the phone so as to keep his place in a waiting queue.

This is awful and frustrating experience to a caller during a busy time when he or she probably has to wait a long time before an agent appears. He is also not sure how long he will have to wait. Toll charges, either at the company side or at the customer side, are wasted during the unproductive waiting time and many connection lines are wastefully occupied as well.

Directed to the above problem, U.S. Pat. No. 5,627,884 issued to Mark Williams, et al., discloses a method in which the call center will disconnect the inbound call and will call back to the caller when an agent is available to the caller. The caller does not need to remain on hold, but his place in the waiting queue is kept. In effect, the caller is kept on a "virtual hold". However, the method disclosed in the '884 patent still has many disadvantages as discussed below.

The caller does not have any control over when the call center will return the call. Even though the rough timing may be convenient to the caller, the exact moment the phone rings may not be. For example, the caller may be in another room, or even on the telephone with another call.

Furthermore, the caller may have lost his interest in waiting for the call or for some reason simply can not wait for the call. In such a situation, the call center wastes its resources in trying the call.

If the caller calls into the call center from his own extension in a large company, it and will be not convenient for the call center to call back. Specifically, the call center will get the main number, and will be unaware of how to contact the caller.

In general, the prior arrangement of requiring a call center to call back results in many situations where the call center attempts to call back the caller but the attempted call back is unsuccessful.

SUMMARY OF THE INVENTION

The present invention is directed to the above problems existing in the prior art.

According to the present invention, upon receiving the first inbound call from a caller, the call center assigns and keeps a place for the caller in a waiting queue. The call center also assigns a time window to the caller within which the caller shall call back to claim his place in the queue. The call is in a "virtual hold."

An identifier is also assigned for the caller which will be used to verify his identity when he calls back within the specified time window. The caller may call back in any moment convenient to him within the assigned time window.

Preferably, the time window is immediately assigned to him during the first inbound call. The caller will be sure how long he will have to wait and when he should call back.

In another embodiment, the call center may remind the caller to call back by ringing his phone but hanging up before he answers, or by sending a reminder over the Internet. In this way, the caller does not have to nervously keep in mind the time window and may concentrate on doing something else as long as he can hear the ringing of the phone. No cost occurs to the call center for its reminder ringing since no connection is completed.

In still another embodiment, the call center maintains statistics on the speed at which it can process the calls in the queue. When it is determined that it will process the virtually queued call within a specified time frame, it will signal the caller to call back. Callers calling back within that time frame may optionally have priority treatment over callers waiting in the queue with their original call.

BRIEF DESCRIPTION OF THE DRAWINGS

The above and other features and advantages of the present invention will be clearer from the following detailed description of preferred embodiments of the invention with reference to the accompanying drawings, in which.

DETAILED DESCRIPTION OF THE PREFERRED EMBODIMENT

Figure 1:
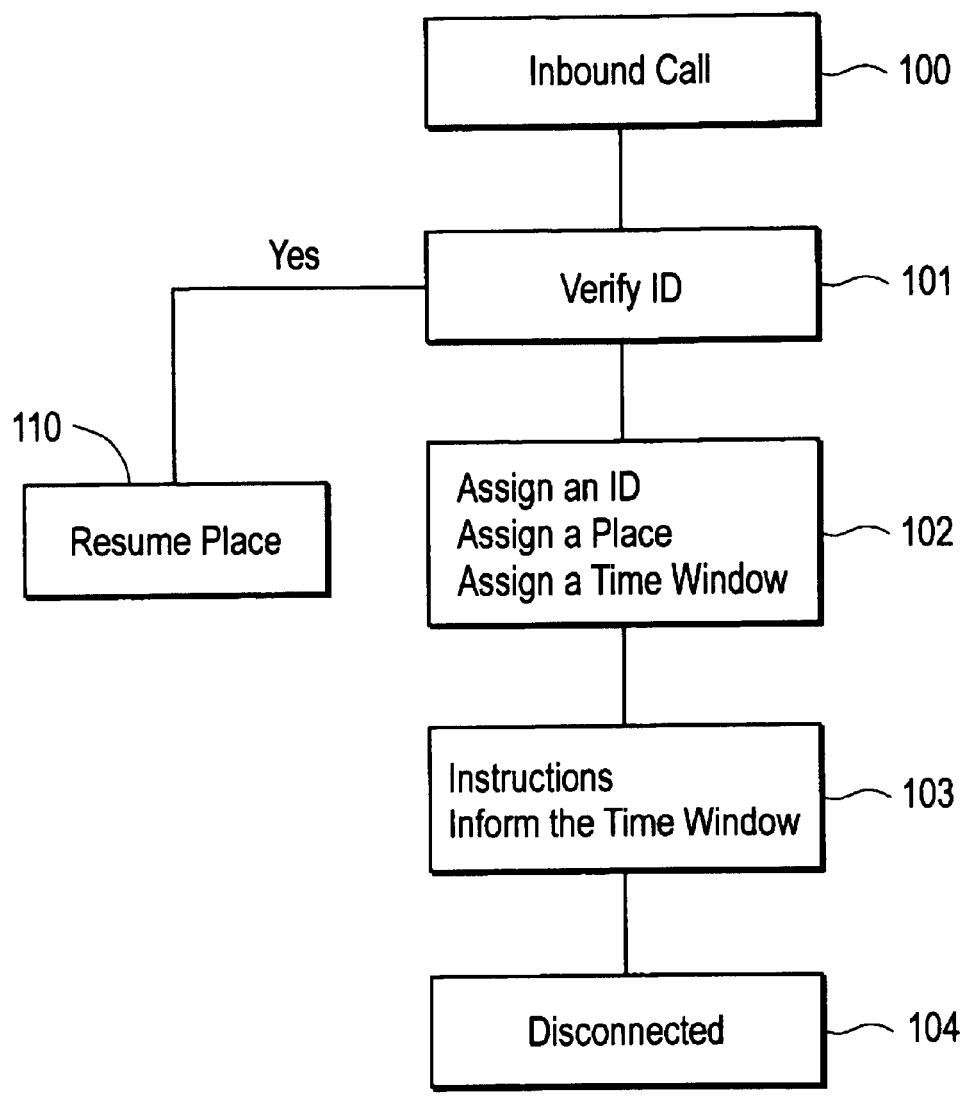
FIG. 1 is a schematic flow chart illustrating a first embodiment of the call processing method of the present invention.

When a caller calls for the first time into a call center during a busy time, usually all the agents in the call center are busy with their customers and no agent can be immediately available to the caller. The call center assigns a place for the caller in the waiting queue according to the time he calls in. The place assigned to the caller is kept in the database of the call center even though this first call is disconnected. The caller may call back into the call center in a later time window, which is assigned to the caller as explained in detail below, to claim his place reserved in the call center queue.

The caller is played a message during the first indicating that the call center is busy and that he should call back. He may be told that the call center will remind him when to call back, and/or he may be given a time window within which to call back. The caller may then hang up.

In a first embodiment of the present invention, the time window is assigned to the caller during the first call. This time window is determined based upon the average waiting time that a typical caller has to wait in the queue for an available agent. The time window as thus determined will be approximately the time when an agent can be actually available to each caller. To allow for the user to slightly delay call back the time window may begin slightly before the estimated service time, say two minutes.

For example, based upon the present load, it will take 20 minutes for a typical caller to wait in the queue before an agent is available to him, the call center may predict that an agent will be likely available to a particular caller 20 minutes after his first call. If the call center receives the first call from the particular caller at 10:00 am, the predicted available time is therefore 10:20 am. The caller may be instructed to call back to 10:18 am.

According to the prediction, the call center assigns a time window, e.g., 10:14 am–10:18 am for this particular caller. The caller is preferably informed of this assigned time window during the first call. If the caller calls back within this time window, his place in the queue will be claimed. Because the time window is close to the predicted available time, even though probably no agent may be immediately available to him when he calls back into the call center during the time window, usually he will not wait for a long time.

If a caller is waiting for a reminder ring to call back, it is possible for the reminder to not be scheduled to occur until after the time at which the virtually queued call is to be serviced. For example, suppose during the original call, the caller is told that he will be reminded to call back in approximately 20 minutes. If the next few calls in the queue are processed faster than expected, the call center may be ready to process the call in 15 minutes. Alternatively, the call center may simply advise the caller to call back without a reminder in 20 minutes, but nonetheless, the call center may be ready to process the call in 15 minutes.

The above issue may be accounted for in several ways. The first technique involves giving the caller an outer bound of time during which he will be reminded to call back (e.g., a single ring of his telephone after which the call center hangs up). If it is told he will be reminded no later than 20 minutes from now, then if call processing goes faster than expected, the system will call him back at a sooner time.

Moreover, if he is given an outer bound of 20 minutes and processing goes slower than expected, then his call will be bumped up to the top of the queue when he calls back. This means that if a caller is told to call back in 20 minutes and he calls back there is still a 15-minute queue, he will not be told to call back again, but will instead have his call expedited.

Alternatively, the caller may simply call back after the time that his call should have been processed. If based upon instructions from the call center, the caller calls back after the time that his call should have been processed, he does not lose his place in the queue but is instead bumped up to the top of the queue. As a general rule, the call center simply estimates the time at which the call will be processed and if the caller relies upon that time as instructed during the first call to call back, then calling back after or before the time that the call center would normally process the caller's call does not result in the caller losing his place in the queue.

If the caller decides on his own not to call back within the time window, contrary to call center instructions, his place in the queue will be erased.

The prediction of the time may be made on the actual statistics, in which the fact that only a percentage of the callers will call back has also been taken into account.

The length of the time window may be determined based on the factors such as the reliability of the prediction, the convenience to the caller, etc.

An identification shall be assigned to caller for him to claim his place in the queue when he calls back with the time window assigned to him. Preferably, the telephone number from which the caller generates the first inbound call is used as the identification of the caller. This can be conveniently and automatically implemented by an Automatic Number Identification (ANS) system by which the call center can automatically retrieve the telephone number of an inbound call. The caller is required to call back using the same telephone as he placed the first call.

As an alternative, the call center may assign the caller an identification other than the phone number. With the identification, the caller may call back from another telephone during the time window. This is convenient if he cannot stay with the telephone with which he placed the first call, for example when he is traveling on the street. When he calls back, he will be prompted to provide the identification, manually or verbally, to the call center. Therefore, he must remember the identification assigned to him. The system may separate call backs from original calls. One technique is to provide a different telephone number for all call backs. When a call comes in on one of the lines assigned to the "call back" number, the system knows to check the queue based upon the ANI data or an entered identifier. The alternate number serves to identify for processing those calls that represent call backs and thus require processing to locate where they are in the queue, expedited processing, etc.

FIG. 1 shows the schematic flow chart of the first embodiment of the invention as explained above. Upon receiving an inbound call from a caller at step 100, the call center checks the caller's identification at step 101. The call center may check through the valid identification in view of the time when the inbound call comes in.

If the identification is verified, the call center recognizes it is a call back and therefore, at step 110, resumes the place of the caller in the queue which was assigned to him in his first call. The caller is instructed to keep on hold and an agent will be available to him soon. The place of the caller is automatically erased when an agent is connected to the caller.

If no valid identification can be found or verified for the caller, the caller will be identified as a first caller from a new caller, and automatically assigns the new caller a place in the waiting queue, an identification, and a time window at step 102. At step 103, the call center informs the new caller of his time window and instructs him to call back. Instructions may include information such as how to use the call back service and the identification. After step 103, the call is disconnected at step 104.

Preferably, the call center also reminds, at a time close to the time window or at the beginning of the time window, the caller to call back. As an advantageous method, the call center may dial the telephone of the caller and hang up before the call is answered. For example, the call center may dial the telephone of the caller and hang up after one ring. In this way, the caller may concentrate on doing something without fear of forgetting to call back in the time window. No phone charges are incurred by the call center since no connection is completed.

Of course, the reminder may be sent by e-mail, fax, pager, etc.

Preferably, the call center can provide more than one time window for the caller to select one from them. If the first time window, which is usually the closest one predetermined by the average waiting time, is not convenient to the caller, the caller may deny it and the call center then provides later time windows for the caller to select. After the selection, the call center will adjust the place of the caller in the waiting queue accordingly.

In the same way, it is possible to remind the caller to call back earlier if an agent happens to be available to the caller earlier than the time window. In other words, the call center may generate the reminding phone ring when an agent is available to the caller. This may move the waiting queue faster by minimize the number of idle agents. This is helpful when the predicting of an appropriate time window can not be accurate due to wide variations in processing times for calls.

Figure 2:
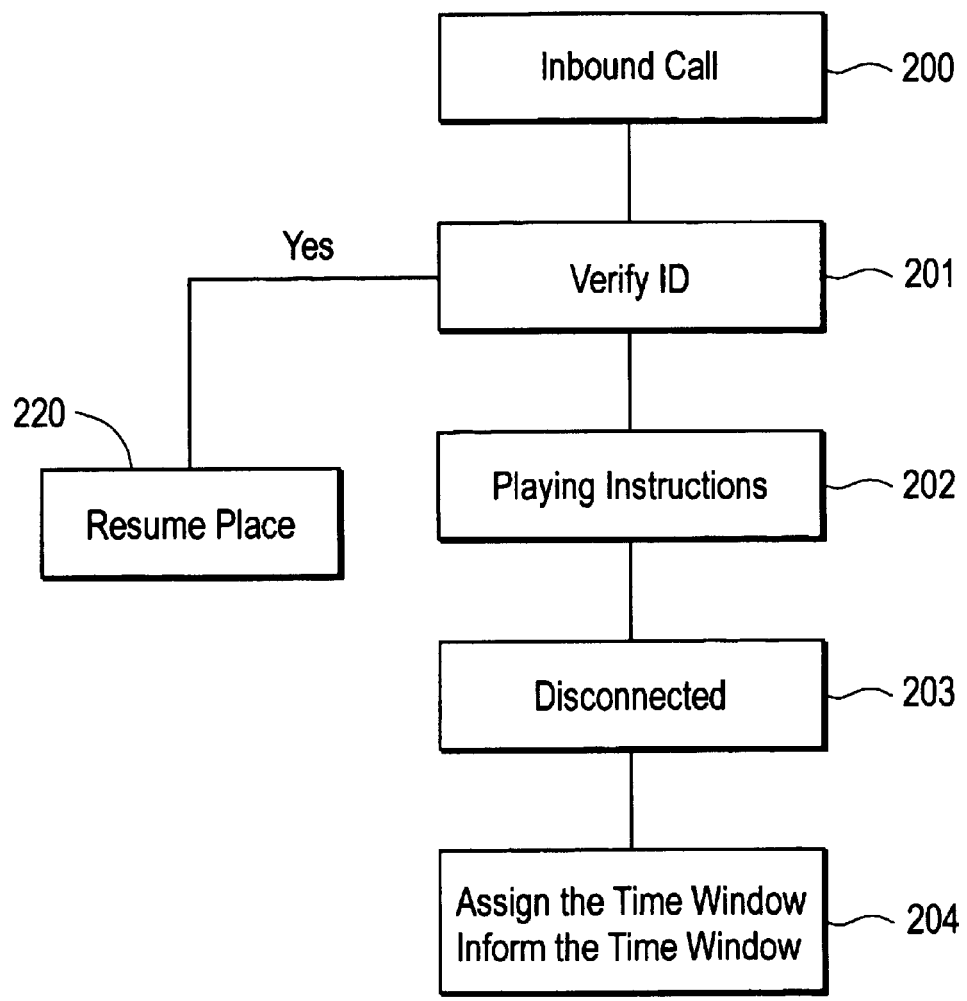
FIG. 2 is a schematic flow chart illustrating a second embodiment of the call processing method of the present invention.

In another embodiment of the present invention as illustrated in FIG. 2, the time window is not given to the caller during the first call. After an inbound call comes in, the call center at step 200, like in FIG. 1, checks the identification of the caller at step 201. If the identification of the caller is verified, the call center will resume the place of the caller at step 220, instructing him to keep holding and an agent will be available to him soon.

If the identification is not verified at step 201, the call will be identified as a first inbound call from a new caller and an identification and place in a waiting queue is automatically assigned to the caller at step 202. No time window is predicted at this time.

The call center simply play instructions regarding how to use the call back service and also inform him of the identification if it is not the caller's telephone number. The instructions shall comprise how the caller will be informed of his time window. For example, a message plays stating. ("I will send you an e-mail at your on file e-mail address to tell you when I will call you back.") The call then is disconnected at step 203.

When a time window can be determined for the caller, the call center informs the caller at step 204. The method of informing the caller of the time window may be agreed upon at step 202 during the first call in which the caller is prompted to selectively instruct the call center how he shall be informed. For example, the call center may send a message to the pager of the caller, or to an Internet address given by the caller.

In this embodiment, the call center does not have to predict the time window as early, which is sometimes not accurate or impossible. The time window may be determined at a later time and therefore more accurate.

Preferably, the time window is determined when an agent is about to be actually available to the caller. The call center will dial the caller's phone number, which also serves as his identification via the automatic number identification system of the call center, and hang up immediately after the first ring. The time of the dialing is set as a few minutes before the beginning of the time window within which the caller shall call back to claim his place in the queue. The length of the time window can be set for the convenience of the caller. The caller does not have to remember any time window but simply stay near the phone, doing his own things.

An improvement may be possible if the call center gives, during the first call, the caller a roughly predicted time point that the caller is likely to be informed of the time window. This does not require a precise prediction of the time window during the first call but will assure the caller how long he will stay near the phone. The roughly predicted time point does not serve as the time window in which the caller shall call back to claim his place.

An important advantage of the present invention is in that it is the caller but not the call center that generate the second call for call back. The caller may call back at any convenient moment to him within the time window. The conversation between an agent of the call center and the caller can always be successfully established in the second call from the caller, even when he is not at the location from which he made the first call. The service capacities of the call center can be employed optimally since the wasted effort to generate a second call is avoided.

It should be appreciated that various changes are possible to the above described embodiment without departing from the spirit of the present invention.

What is claimed:

1. A method for a call center to establish a successful connection between an agent and a caller when no agent is immediately available to said caller, comprising the steps of:
   a. after receiving a first inbound call from said caller, automatically assigning and keeping a place for said caller in a waiting queue;
   b. assigning an identification and a time window to said caller within which said caller shall call back to claim said place in said queue;
   c. electronically informing said caller of said time window;
   d. disconnecting said call; and
   e. upon receiving a second inbound call from said caller within said time window, verifying said caller by said identification and resuming said place of said caller in said waiting queue.

2. The method of claim 1 wherein said time window is automatically determined on an average waiting time that each caller has to wait for an available agent.

3. The method of claim 2 wherein said average waiting time is obtained from actual statistics.

4. The method of claim 1 wherein said step b further comprises a step of providing a plurality of time windows to said caller to select one from them.

5. The method of claim 1 further comprising a step of, after step d, reminding said caller to make said second inbound call.

6. The method of claim 5 wherein said step of reminding is carried out by electronically dialing a telephone of said caller and hanging up before said caller answers.

7. The method of claim 6 wherein said step of reminding is implemented just before or when said time window begins.

8. The method of claim 6 wherein said step of reminding is implemented when an agent is actually available to said caller.

9. The method of claim 6 wherein said hanging up is effectuated immediately after one ring of said telephone.

10. The method of claim 1 wherein said step b further includes a step of electronically informing said caller of said identification.

11. The method of claim 1 wherein said identification is a telephone number of a telephone from which said first inbound call was placed.

12. The method of claim 11 wherein said telephone number is automatically retrieved by an automatic number identification system of said call center.

13. The method of claim 1 wherein said step e further comprises a step of prompting said caller to provide said identification.

14. The method of claim 1 further comprising a step of erasing said place and identification of said caller after said time window.

15. The method of claim 1 wherein said time window begins immediately after said step d.

16. The method of claim 15 wherein said step e further comprises a step of bumping said place of said caller up to the top of said queue if said caller calls back within said time window but after a time of his turn in said queue.

17. The method of claim 1 wherein said step c further comprises a step of informing said caller of a second telephone number for him to make said second inbound call, said second telephone number being different from a first telephone number which said caller has dialed for his first inbound call.

18. A method for a call center to establish a successful conversation between an agent and a caller when no agent is immediately available to said caller, comprising the steps of:
   a. after receiving a first inbound call from said caller, automatically assigning and keeping a place for said caller in a waiting queue;
   b. assigning an identification for said caller and electronically instructing said caller to call back in a time window, of which he will be informed later, to claim his place in the queue;
   c. disconnecting said inbound call;
   d. assigning said time window to said caller;
   e. electronically informing said caller of said time window; and
   f. upon receiving a second inbound call from said caller in said time window, verifying said identification of said caller and resuming his place in said waiting queue.

19. The method of claim 18 wherein said time window is determined by an average waiting time that each caller has to wait in the queue for an available agent.

20. The method of claim 18 further comprising a step of, before step c, prompting said caller to selectively input instructions and information regarding how said caller shall be informed of said time window.

21. The method of claim 18 wherein said step e comprises a step of electronically dialing a telephone of said caller and hanging up before said caller answers.

22. The method of claim 21 wherein said hanging up is effectuated after one ring of said telephone.

23. The method of claim 21 wherein said dialing is carried out at the beginning of said time window.

24. The method of claim 23 wherein said time window is determined and begins just before or when an agent is actually available to said caller.

25. The method of claim 18 wherein said step e is implemented by sending a message through a packet-based network to an internet address of said caller.

26. The method of claim 18 wherein said step e is implemented by sending a message to a pager of said caller.

27. The method of claim 18 wherein said step b further comprises the steps of:
   automatically assigning an approximate time point to said caller around which said caller will be informed of said time window; and
   electronically informing said caller of said approximate time point.

28. The method of claim 27 wherein said approximate time is automatically determined on an average waiting time that each caller has to wait in the queue before an agent is available to him.

29. The method of claim 18 wherein said identification is a telephone number of a telephone by which said first inbound call is placed by said caller.

30. The method of claim 29 wherein said telephone number is automatically retrieved by an automatic number identification system of said call center.

31. The method of claim 18 wherein said step b further comprises a step of electronically informing said caller of said identification, and said step f further comprises a step of prompting said caller to provide said identification.

32. The method of claim 18 further comprising a step of informing said caller of a second telephone number for him to make said second inbound call, said second telephone number being different from a first telephone number which said caller has dialed for his first inbound call.

33. A method for a call center to establish a successful conversation between an agent and a caller when no agent is immediately available to said caller, comprising the steps of:
   a. after receiving a first inbound call from said caller, automatically assigning and keeping a place for said caller in a waiting queue;
   b. assigning an identification to said caller;
   c. instructing said caller to call back later;
   d. disconnecting said call; and
   e. upon receiving a second inbound call from said caller, verifying said caller by said identification and resuming said place of said caller in said waiting queue.

34. The method of claim 33 wherein said step e further comprises a step of bumping said place of said caller up to the top of said queue if said caller calls back after a time of his turn in said queue.

35. The method of claim 33 wherein said step c further comprises a step of assigning a time to said caller and informing said caller to call back before said assigned time so as to claim his place in said queue.

36. The method of claim 35 wherein said step e further comprises a step of bumping said place of said caller up to the top of said queue if said caller calls back before said assigned time but after a time of his turn in said queue.

37. The method of claim 35 further comprising a step of erasing said place of said caller in said queue after said assigned time.

38. The method of claim 33 wherein said step c further comprises a step of assigning a time window and informing said caller of said time window within which said caller shall call back to claim his place in said queue.

39. The method of claim 33 further comprising a step of keeping said place of said caller at the top of said queue after a time of said caller's turn until receiving said second inbound call from said caller.

40. The method of claim 38 wherein said step e further comprises a step of bumping said place of said caller to the top of said queue if said caller calls back within said time window but after a time of his turn in said queue.

41. The method of claim 33 further comprising a step of, after step d, reminding said caller at a time of his turn.

42. The method of claim 41 wherein said step of reminding comprises a step of electronically dialing a telephone of said caller and hanging up before said caller answers.

43. The method of claim 38 further comprising a step of, after step d, reminding said caller to call back.

44. The method of claim 43 wherein said step of reminding is implemented just before or when said time window begins.

45. The method of claim 43 wherein said step of reminding is implemented when an agent is actually available to said caller.

46. The method of claim 33 further comprising a step of, before said step d, assigning a second telephone number to said caller and instructing said caller to dial said second telephone number to call back, said second telephone number being different from a first telephone number by which said caller made said first inbound call.

47. The method of claim 33 further comprising a step of erasing said place of said caller after a conversation is established between an agent and said caller.

48. A system in a call center for processing an inbound call from a caller, comprising:

a sequence coordinator, arranged to automatically assign and keep a place for said caller in a waiting queue, upon receipt of an inbound call of said caller;

an identifier, arranged to assign an identification to said caller and to verify said identification;

a temporal interval assigner, arranged to assign a time window for said caller within which said caller shall call back to claim his place in said queue;

an informer, arranged to electronically inform said caller of said time window and to instruct him to call back within said time window; and a place holder, arranged to resume said place of said caller, when said identification of said caller is verified.

49. The system of claim 48 further comprising a temporal interval informer, arranged to electronically remind said caller when said time window begins.

50. The system of claim 48 further comprising an agent availability informer, arranged to electronically remind said caller when an agent is available to said caller.

51. The system of claim 48 wherein said identifier comprises an automatic number identification system that can automatically retrieve a telephone number of an inbound call.

52. The system of claim 48 further comprising a prompter, arranged to electronically prompt said caller to provide said identification upon receiving an inbound call of said caller.

53. An article comprising a computer readable medium having instructions stored thereon which when executed causes a call center to establish a successful connection between an agent and a caller when no agent is immediately available to said caller, by:
   a. after receiving a first inbound call from said caller, automatically assigning and keeping a place for said caller in a waiting queue;
   b. assigning an identification and a time window to said caller within which said caller shall call back to claim said place in said queue;
   c. electronically informing said caller of said time window;
   d. disconnecting said call; and
   e. upon receiving a second inbound call from said caller within said time window, verifying said caller by said identification and resuming said place of said caller in said waiting queue.

54. An article comprising a computer readable medium having instructions stored thereon which when executed causes a call center to establish a successful conversation between an agent and a caller when no agent is immediately available to said caller, by:
   a. after receiving a first inbound call from said caller, automatically assigning and keeping a place for said caller in a waiting queue;
   b. assigning an identification for said caller and electronically instructing said caller to call back in a time window, of which he will be informed later, to claim his place in the queue;
   c. disconnecting said inbound call;
   d. assigning said time window to said caller;
   e. electronically informing said caller of said time window; and
   f. upon receiving a second inbound call from said caller in said time window, verifying said identification of said caller and resuming his place in said waiting queue.

55. An article comprising a computer readable medium having instructions stored thereon which when executed causes a call center to establish a successful conversation between an agent and a caller when no agent is immediately available to said caller, by:
   a. after receiving a first inbound call from said caller, automatically assigning and keeping a place for said caller in a waiting queue;
   b. assigning an identification to said caller;
   c. instructing said caller to call back later;
   d. disconnecting said call; and
   e. upon receiving a second inbound call from said caller, verifying said caller by said identification and resuming said place of said caller in said waiting queue.

* * * * *